United States Patent
Datta et al.

(10) Patent No.: US 12,333,606 B2
(45) Date of Patent: Jun. 17, 2025

(54) CENTRALIZED BUDGET DASHBOARD AND REPORTING SYSTEM AND METHOD

(71) Applicant: RAKUTEN SYMPHONY, INC., Tokyo (JP)

(72) Inventors: Anindita Datta, Tokyo (JP); Hitomi Waki, Tokyo (JP)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 17/759,722

(22) PCT Filed: Jun. 2, 2022

(86) PCT No.: PCT/US2022/031893
§ 371 (c)(1),
(2) Date: Jul. 29, 2022

(87) PCT Pub. No.: WO2023/234937
PCT Pub. Date: Dec. 7, 2023

(65) Prior Publication Data
US 2024/0185348 A1 Jun. 6, 2024

(51) Int. Cl.
*G06Q 40/06* (2012.01)
(52) U.S. Cl.
CPC .................. *G06Q 40/06* (2013.01)
(58) Field of Classification Search
CPC ...................................... G06Q 40/00
USPC ........................................... 705/35
See application file for complete search history.

(56) References Cited

U.S. PATENT DOCUMENTS

| | | | | |
|---|---|---|---|---|
| 6,049,778 A * | 4/2000 | Walker | ............... | G06Q 30/0212 705/14.39 |
| 8,818,835 B2 * | 8/2014 | Anderson | ............... | G06F 40/18 705/7.17 |
| 9,189,816 B1 * | 11/2015 | Walsh | ............... | G06Q 40/10 |
| 11,551,291 B1 * | 1/2023 | Lopez | ............... | G06Q 40/00 |
| 2005/0197954 A1 * | 9/2005 | Maitland | ............ | G06Q 10/0631 705/39 |
| 2007/0094082 A1 * | 4/2007 | Yruski | ............... | G06Q 30/0277 705/14.56 |
| 2008/0033776 A1 * | 2/2008 | Marchese | ............... | G06Q 20/10 705/37 |
| 2008/0103907 A1 * | 5/2008 | Maislos | ............ | G06Q 30/0269 705/14.54 |
| 2010/0250420 A1 * | 9/2010 | Ariff | ............... | G06Q 40/00 705/35 |

(Continued)

Primary Examiner — Kirsten S Apple
(74) Attorney, Agent, or Firm — HAUPTMAN HAM, LLP (57) ABSTRACT

A centralized budget dashboard and report system (CBDRS) includes a memory having non-transitory instructions stored therein; and processing circuitry coupled to the memory, and being configured to execute the non-transitory instructions, thereby causing the processing circuitry to cause a graphical user interface (GUI) to be output by a user interface (UI), the GUI including a first user input field configured to receive a first user input identifying an authorized user to log in to the CBDRS; in response to a successful log in to the CBDRS, obtain master data from the memory, the master data being associated with the authorized user; and update the GUI output by the UI, the updated GUI including a budget dashboard configured to display budget data associated with the authorized user.

20 Claims, 7 Drawing Sheets

(56) References Cited

U.S. PATENT DOCUMENTS

| | | | | |
|---|---|---|---|---|
| 2011/0246267 A1* | 10/2011 | Williams | ............... | G06Q 30/08 |
| | | | | 705/14.4 |
| 2012/0005028 A1* | 1/2012 | Stone | ..................... | G06Q 30/08 |
| | | | | 705/14.71 |
| 2012/0022945 A1* | 1/2012 | Falkenborg | ........ | G06Q 30/0255 |
| | | | | 706/12 |
| 2013/0030994 A1* | 1/2013 | Calman | ................. | G06Q 40/00 |
| | | | | 705/40 |
| 2013/0246106 A1* | 9/2013 | Kroetsch | ............... | G06Q 10/06 |
| | | | | 705/7.12 |
| 2014/0365298 A1* | 12/2014 | Tang | ...................... | G06Q 30/02 |
| | | | | 705/14.48 |
| 2015/0081425 A1* | 3/2015 | Siegman | ............... | G06Q 30/02 |
| | | | | 705/14.46 |
| 2015/0206176 A1* | 7/2015 | Toval | ................ | G06Q 30/0245 |
| | | | | 705/14.58 |
| 2015/0222723 A1* | 8/2015 | Adapalli | ............. | G06Q 10/067 |
| | | | | 705/26.41 |
| 2016/0078559 A1 | 3/2016 | Ventura | | |
| 2016/0180386 A1* | 6/2016 | Konig | ............... | G06Q 30/0255 |
| | | | | 705/14.55 |
| 2017/0337505 A1* | 11/2017 | Chittilappilly | ......... | G06N 20/00 |
| 2023/0042458 A1* | 2/2023 | Makhija | ................ | G06Q 10/06 |

\* cited by examiner

CENTRALIZED BUDGET DASHBOARD AND REPORTING SYSTEM AND METHOD

RELATED APPLICATIONS

The present application is a National Phase of International Application No. PCT/US2022/031893, filed Jun. 2, 2022.

TECHNICAL FIELD

This description relates to a centralized budget dashboard and reporting system and method of using the same.

BACKGROUND

A budget is a financial plan for a defined period. A budget includes planned sales volumes and revenues, resource quantities, costs and expenses, assets, liabilities, and cash flows. Companies, governments, families, and other organizations use a budget to express strategic plans of activities or events in measurable terms. A budget is the sum of finances allocated for a particular purpose and the summary of intended expenditures along with proposals for how to meet the intended expenditures. A budget surplus includes income exceeding the expenditures, a budget deficit includes expenditures exceeding income, and a balanced budget where the expenditures are substantially equal to the income.

Often an organization includes multiple departments, each include multiple project-teams working on separate projects. Typically, a person-in-charge (PIC) of a given department is responsible for managing the workflow of the department, and the PIC of a given project is responsible for managing the workflow of the project.

SUMMARY

In some embodiments, a centralized budget dashboard and report system (CBDRS) includes a memory having non-transitory instructions stored therein; and processing circuitry coupled to the memory, and being configured to execute the non-transitory instructions, thereby causing the processing circuitry to cause a graphical user interface (GUI) to be output by a user interface (UI), the GUI including a first user input field configured to receive a first user input identifying an authorized user to log in to the CBDRS; in response to a successful log in to the CBDRS, obtain master data from the memory, the master data being associated with the authorized user; and update the GUI output by the UI, the updated GUI including a budget dashboard configured to display budget data associated with the authorized user.

In some embodiments, a method executed by processing circuitry including causing a graphical user interface (GUI) to be output by a user interface (UI), the GUI including a first user input field configured to receive a first user input identifying an authorized user to log in to a centralized budget dashboard and report system (CBDRS); in response to a successful log in to the CBDRS, obtaining master data from a database, the master data being associated with the authorized user; and updating the GUI output by the UI, the updated GUI including a budget dashboard configured to display budget data associated with the authorized user.

In some embodiments, a non-transitory computer readable medium including instructions executable by a controller to perform operations including causing a graphical user interface (GUI) to be output by a user interface (UI), the GUI including a first user input field configured to receive a first user input identifying an authorized user to log in to a centralized budget dashboard and report system (CBDRS); in response to a successful log in to the CBDRS, obtaining master data from a database, the master data being associated with the authorized user; and updating the GUI output by the UI, the updated GUI including a budget dashboard configured to display budget data associated with the authorized user.

BRIEF DESCRIPTION OF THE DRAWINGS

Aspects of the present disclosure are best understood from the following detailed description read with the accompanying figures. In accordance with the standard practice in the industry, various features are not drawn to scale. The dimensions of the various features are arbitrarily increased or reduced for clarity of discussion.

DETAILED DESCRIPTION

The following disclosure is configured with different embodiments, or examples, for implementing features of the provided subject matter. Examples of components, materials, values, operations, arrangements, or the like, are described below to simplify the present disclosure. These are, of course, examples and are not limiting. Other components, materials, values, operations, arrangements, or the like, are contemplated. For example, the formation of a first feature over or on a second feature in the description that follows includes embodiments in that the first and second features are formed in direct contact and includes embodiments in that additional features are formed between the first and second features, such that the first and second features are unable to be in direct contact. In addition, the present disclosure repeats reference numerals and/or letters in the various examples. This repetition is for the purpose of simplicity and clarity and does not dictate a relationship between the various embodiments and/or configurations discussed.

Further, spatially relative terms, such as "beneath," "below," "lower," "above." "upper" and the like, are used herein for ease of description to describe one element or feature's relationship to another element(s) or feature(s) as illustrated in the FIGS. The spatially relative terms are intended to encompass different orientations of the device in use or operation in addition to the orientation depicted in the FIGS. The apparatus is otherwise oriented (rotated 90 degrees or at other orientations) and the spatially relative descriptors used herein likewise are interpreted accordingly.

In some embodiments, a centralized budget dashboard and report system (CBDRS) is discussed. In some embodiments, the CBDRS presents graphical user interfaces (GUIs) that allow a user to view a budget report and to customize the budget report according to the user's requirements. In some embodiments, the CBDRS includes real-time (describes various operations in computing or other processes that provide response times within a time (deadline), usually a relatively short time) budget overview (e.g., updated budget reports whenever the user accesses the CBDRS). In some embodiments, the CBDRS includes multi-level (e.g., department level, project level, or other suitable budgets within scope of the present disclosure) and multi-party (e.g., vendors, departments, or other suitable budget categories within scope of the present disclosure) budget reports. In some embodiments, the CBDRS includes one or more budget reports directed to a user (e.g., budget reports associated with the user are presented). In some embodiments, the CBDRS includes top budget (e.g., top five, or top ten) presentation in a single pane (e.g., allow the user to easily compare multiple budget reports).

In some embodiments, the CBDRS computes and presents budget reports in different granularity (e.g., monthly, yearly, quarterly, or other suitable periodic presentations within scope of the present disclosure).

Conventional budget management systems are unable to provide for managing multiple types and levels of budgets (e.g., department level budget, project level budget, or other suitable budgets within scope of the present disclosure). Further, conventional budget management systems do not provide a dashboard and report system for an overview of multiple types and levels of budgets which improves the efficiency in managing the budgets. Similarly, conventional budget management systems are unable to provide for dashboard and report multiple types and levels of budgets.

A dashboard is a type of GUI which often provides at-a-glance views of key performance indicators (KPIs) relevant to a particular objective or business process. In other usage, dashboard is another name for progress report or report and considered a form of data visualization. The dashboard is often accessible by a web browser and is usually linked to regularly updating data sources.

Planned budget report is used in developing accurate financial planning, in remediating action which cause profit lost, in managing cash flow, or other suitable financial management information within the scope of the present disclosure. In other approaches, planned budget information is collected and derived by a cost office/financial department, based on approved budget applications. Subsequently, static budget reports are generated based on the planned budget information.

Nevertheless, the budget report is normally generated and compiled as one document, such as a pdf document of a few hundred pages containing a lot of information and shared among a lot of users. Further, in other approaches, a budget report is generated and provided in a dedicated period (e.g., once in a year, once in a month, daily, or other suitable periodic presentations within scope of the present disclosure) and is collectively prepared by a cost office/financial department.

These other approaches include problems at the user side. Not all users want to monitor the entire compiled budget report, but instead are only interested in subsections of the budget. Thus, the user spends time and effort to search for relevant budget reports (the situation is exacerbated when the user wants to view multiple subsections of the budget report at the same time). The user is unable to view the budget reports whenever desired, but instead waits for the release of the budget report from the cost office/financial department. In response to an urgent review, the user contacts the cost office/financial department to obtain the entire budget report (this process requires steps like applying for permission, need to know, and other suitable security protocol within scope of the present disclosure and take a lot of time).

Inexperienced users have issues in reviewing budget reports since the budget reports include large amounts of information unrelated to the interests of the user. In a non-limiting example, a user manually searches for information from a budget report; however, without having deep background knowledge, the user is unable to know how to begin to find information of interest from the budget report. This is particularly inefficient when there are many budget applications included in the budget report. Conventional budget report systems are dedicated to a certain level (e.g., department level or project level) There is no system that allows a user to simultaneously view budget reports of varying levels.

In other approaches, there are problems on the cost office/financial department side. In compiling budget reports, the cost office/financial department reviews multiple reports and converts these multiple reports into a standardized/unified format, to compile into a single report. This process is burdensome and time consuming.

Problems exist in response to multiple users reviewing the budget reports at different times and manners (e.g., user A wants to have the annual budget reports for Department A by Date A, user B wants to have the same budget reports by Date B; user C wants to have the budget reports of Department C and project D of region 1, user X wants to have budget reports of department E and project F of region 2). This dynamic nature unduly burdens the cost office/financial department, particularly when the budget reports are urgently desired.

In response to there being many budget reviewers, there is a possibility that the budget reports include information that is unsuitable for some users (e.g., the budget reports include too many details or details of a confidential nature) while ensuring that the budget reports contain the proper information for the user.

The cost office/financial department collects budget data from all associated users, reviews the collected budget data, revises/standardizes the budget data, and compiles and generates a budget report. To do so, the cost office/financial department requires the cost office/financial department PICs to have good knowledge on the budget applications. A new cost office/financial department PIC, who has not previously handled budget applications, has difficulties contributing to the preparation of budget reports.

In some embodiments, the CBDRS allows a user to directly access a dashboard system which shows budget reports associated with the user. Through the dashboard, the user configures what type of reports the system displays. Subsequently, the CBDRS presents the budget reports in a customized manner, and the user exports the reports or share the reports with other users. The user's configured parameters are saved by the CBDRS, such that, when the user accesses the system the next time, the CBDRS automatically retrieves the latest budget data and generates & presents the latest budget reports.

In some embodiments, the CBDRS provides customized reports and illustration to the user. The CBDRS provides budget reports in different granularity, and budgets associated with the user are presented (e.g., unassociated budget reports are excluded, thus making the budget report more concise and precise). In some embodiments, the CBDRS provides updated reports and illustration to the user. In some embodiments, the CBDRS retrieves the latest budget data, and presents the latest budget data to the user. In some embodiments, all processes are performed through interaction with a GUI without involvement of the cost office/financial department. In some embodiments, the CBDRS provides enhanced information security, since the user views and downloads reports of budget applications authorized to be viewed by him.

In some embodiments, the CBDRS includes a centralized budget management system (CBMS), a master data management system (MDMS), and terminals or user interfaces (UI) for users (admin, PIC, or other suitable users within scope of the present disclosure). In some embodiments, the CBMS is communicatively coupled to the MDMS and the terminals of the user.

In some embodiments, budget data of a budget application is stored in a lowest granularity (e.g., monthly is the lowest granularity). Nevertheless, other different granularities, such as hourly, daily, and weekly are contemplated. Accordingly, when a user wants to view the budget application of a higher granularity (weekly, or the like), the CBDRS collects the budget data and compiles the data (e.g., sum the hourly budget data to generate weekly budget data) accordingly. By doing so, the CBDRS provides a flexible budget report system, in which the budget reports are provided in different granularity (e.g., hourly, daily, weekly, monthly, yearly, and other suitable time periods within the scope of the present disclosure).

In some embodiments, the CBDRS includes two GUIs: (1) a dashboard GUI and (2) a report GUI. In some embodiments, the dashboard GUI includes multiple dashboards presented in a single pane to provide illustrations of overviews/summaries of budget applications associated with the user. In some embodiments, the user configures/selects parameters to customize the dashboard illustration, in the report GUI. In some embodiments, the details of the budget reports are presented, and the user opts to share the budget reports with other users, to export the budget reports, to filter the budget reports, or other suitable options within the scope of the present disclosure.

Figure 1:
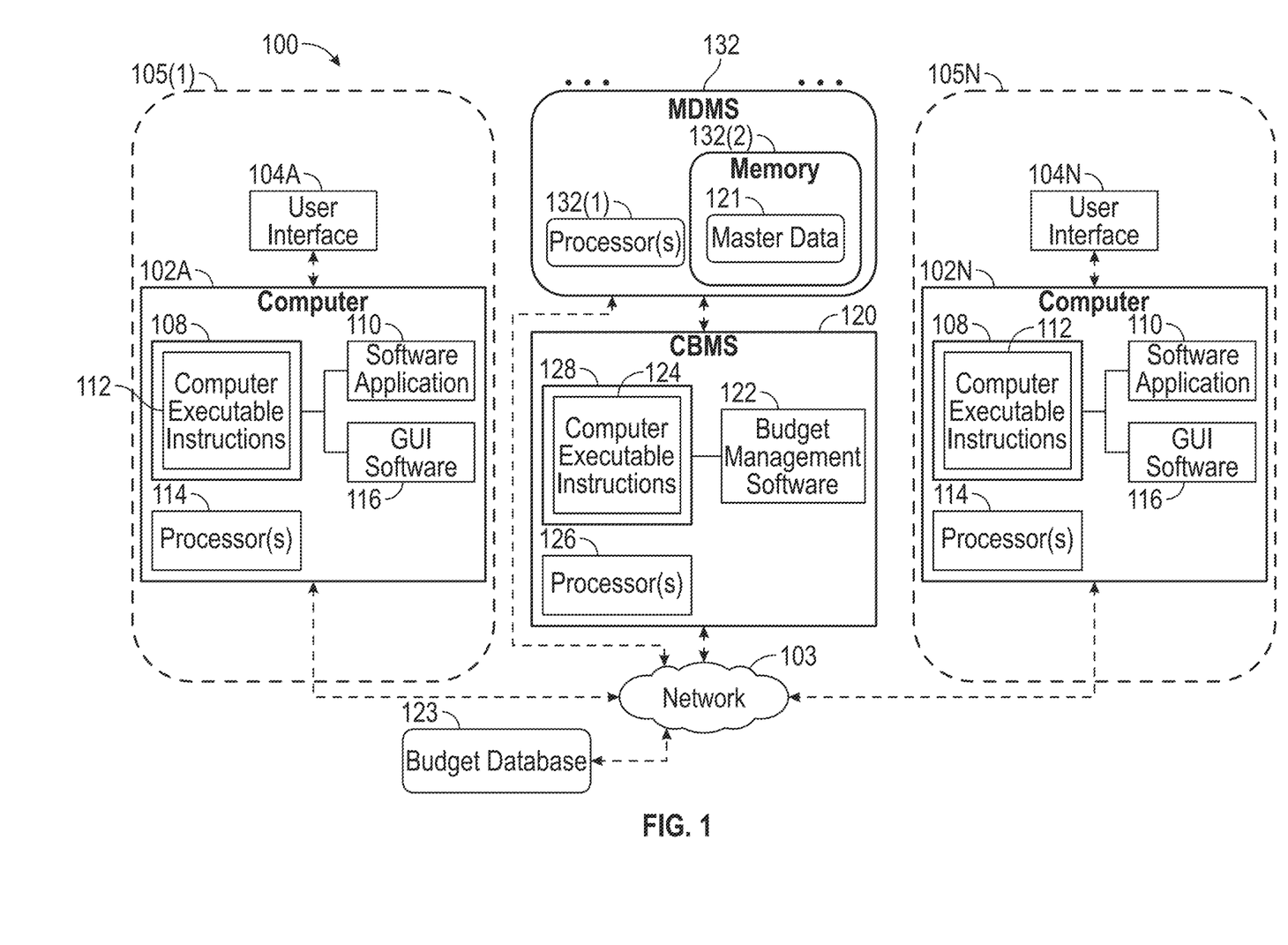
FIG. 1 is a block diagram of a centralized budget dashboard and report system (CBDRS), in accordance with some embodiments.

FIG. 1 is a block diagram of a centralized budget dashboard and report system (CBDRS) 100, in accordance with some embodiments.

CBDRS 100 includes computers 102A through 102N (where N is a positive non-zero number and computers 102A through 102N are referred to generically or collectively as computers 102) in regions 105(1) through 105(N) (where N is a positive non-zero number) that are operably connected to user interfaces (UIs) 104A through 104N (where N is a positive non-zero number and UIs 104A through 104N are referred to generically or collectively as UI 104). Computers 102 are connected to a centralized budget management system (CBMS) 120 and a master data management system (MDMS) 132 through a network 103. Computers 102 are configured to manage the budget approval workflow (through CBMS 120) for each CBDRS user, and to communicate with MDMS 132 configured to store and retrieve master data 121.

Computers 102 are digital electronic machines that are programmed to carry out sequences of arithmetic or logical operations (computation). Computers 102 perform generic sets of operations known as programs that enable computers 102 to perform a wide range of tasks. In some embodiments, computers 102 are computer systems that include the hardware, operating system (main software), and peripheral equipment. In some embodiments, computers 102 further refer to a group of computers that are linked and function together, such as a computer network or computer cluster.

Computers 102, CBMS 120, and MDMS 132 are communicatively connected to each other via network 103 (e.g., through one or more wireless network interfaces such as BLUETOOTH, WIFI, WIMAX, GPRS, or WCDMA, one or more wired network interfaces such as ETHERNET, USB, or IEEE-884, or a combination thereof).

Computers 102 are communicatively connected (e.g., through a device interface) to respective UI 104 (e.g., terminal). In some embodiments, several computers, hundreds of computers, or thousands of computers are present in CBDRS 100. A UI is one or more input/output (I/O) devices capable of: displaying information communicated from processing circuitry, such as processors 114, to one or more users (e.g., through a GUI, and other suitable display methodologies within the contemplated scope of the disclosure), receiving input (e.g., by using a keyboard, a mouse, and/or other suitable means for receiving input in conjunction with a GUI, and other suitable peripheral device configured to put information into and get information out of a computer within the contemplated scope of the disclosure), and communicating the input to the processing circuitry (e.g., over one or more networks, and other suitable modes used to exchange messages between nodes within the contemplated scope of the disclosure). In various embodiments, UI 104 includes one or more I/O devices located at a single region or distributed over multiple regions (e.g., throughout a global organization, or different locations within a same region, and other suitable structures within the contemplated scope of the disclosure). In some embodiments, the UI is operably responsive to GUI software 116 discussed below. In some embodiments, one or more computers, such as computers 102, are set aside for budget administrators. In some embodiments, the remaining computers, such as computer 102 are configured for budgetary originators and reviewers.

In some embodiments, network 103 includes a wide area network (WAN) (i.e., the internet), a wireless WAN (WWAN) (i.e., a cellular network), a local area network (LAN), a wireless LAN (WLAN), a telecommunication network (e.g., 3G, 4G, LTE, 5G, and other suitable communication platforms are within the contemplated scope of the disclosure), or a combination thereof.

Computer executable instructions 112 are stored on non-transitory computer-readable medium 108 within each of computers 102. In some embodiments, a non-transitory computer readable storage medium (e.g., non-transitory computer-readable medium 108) is an electronic, magnetic, optical, electromagnetic, infrared, and/or a semiconductor read circuit (or apparatus or device). In a non-limiting example, a non-transitory computer readable storage medium includes a semiconductor or solid-state memory, a magnetic tape, a removable computer diskette, a random-access memory (RAM), a read-only memory (ROM), a rigid magnetic disk, and/or an optical disk. In some embodiments using optical disks, a non-transitory computer readable storage medium includes a compact disk-read only memory (CD-ROM), a compact disk-read/write (CD-R/W), and/or a digital video disc (DVD).

In some embodiments, forms of non-transitory computer-readable media include, for example, a floppy disk, a flexible disk, a hard disk, a magnetic tape, another magnetic medium, a CD-ROM, CDRW, DVD, another optical medium, punch cards, paper tape, optical mark sheets, another physical medium with patterns of holes or other optically recognizable indicia, a RAM, a PROM, an EPROM, a FLASH-EPROM, an EEPROM, a flash memory, another memory chip or cartridge, or another medium from which a computer reads. The term memory is used herein to refer to a non-transitory computer-readable medium.

Processing circuitry (e.g., one or more processors 114, 126, and 132(1)) include a central processing unit (CPU), a multi-processor, a distributed processing read circuit, an application specific integrated circuit (ASIC), a suitable processing unit, a field programmable gate array (FPGA), or a combination thereof. In some embodiments, the processing circuitry corresponds to one or more processors distributed within a cloud computing environment (e.g., over one or more server clusters).

In some embodiments, GUI software 116 supports forms of human-interface devices that allow users to interact with electronic devices through graphical icons and audio indicator such as primary notation, instead of text-based user interfaces, typed command labels or text navigation. The actions in a GUI are usually performed through direct manipulation of graphical elements (e.g., user input fields, user selection fields, or other suitable user interaction fields within the scope of the present disclosure).

In FIG. 1, CBDRS 100 includes one or more computers 102, MDMS 132, and CBMS 120. In some embodiments, CBDRS 100 includes up to N computers 102, and more than one CBMS 120. In a non-limiting example, a CBMS is available for each region (105(1) through 105(N)) or a CBMS is available for a set of regions. In some embodiments, CBMS 120 is containerized and distributed in a cluster of servers. These and other configurations for CBDRS 100 are within the scope of this disclosure.

CBMS 120 performs budget data management (e.g., creation, modification, deletion, other suitable management functions within the contemplated scope of the disclosure), and MDMS is configured to be used for master data management (e.g., add, delete, configure, or other suitable operations within embodiments of the present disclosure), in addition to storing master data 121. Computer executable instructions 124 are stored on a non-transitory computer readable medium 128.

CBMS 120 is configured to allow multiple users to create and manage a budget (which include varying types of costs). In some embodiments, CBMS 120 allows multiple users to access, create, and manage the user's budget (e.g., department budget, project budget, or other suitable budgets within the contemplated scope of the disclosure) in a systematic (e.g., presented and formulated as a coherent body of budget ideas and principles) and unified manner (e.g., consistent with other project-team PICs and company employees).

Budget management software 122 is configured to manage the creation, editing, and storing of budget data 123 in budget database 123. In some embodiments, budget database 123 is a building, a dedicated space within a building, or a group of buildings used to house computer systems and associated components, such as telecommunications and storage systems.

To manage the creation, editing, and storing of budget data in budget database 123 and to perform other functions, computers 102 implement various software applications 110 and GUI software 116. Software applications 110 and GUI software 116 are provided as computer executable instructions 112 that are executable by processing circuitry 114 in each of computers 102. Software applications 110 (application or app for short) are computer programs designed to carry out a task other than one relating to the operation of the computer itself, typically to be used by end-users. Budgeting and accounting software is an example.

Budget data within budget database 123 (e.g., department budget data or project budget data discussed below) are database elements including globally applicable, top-level budget data and itemized budget data corresponding to specific items within a given budget. Non-limiting examples of top-level budget data include department or project names or other identifiers, department or project descriptions, budget types or categories, fiscal years, PIC or other usernames, revision indicators, approval status indicators, total amounts, currency identifiers, cost center or other organizational section identifiers, account level identifiers, and other suitable information within the contemplated scope of the disclosure. Non-limiting examples of itemized budget data include time divisions such as months or quarters, location identifiers, measurement identifiers, item identifiers, item descriptions, unit prices, quantities, rental costs, rental durations, labor rates, labor hours, labor descriptions, outsourcing/contract costs, outsourcing/labor descriptions, team or group identifiers, account level indicators, item amounts, sub-total amounts, currencies, currency exchange rates, and other suitable budget information within the contemplated scope of the disclosure.

The database elements of budget data within budget database 123 are controlled by budget management software 122 through processing circuitry 126 as discussed below to have predetermined structures (e.g., data element size, range of values, and other suitable presentations within the contemplated scope of the disclosure) and relationships (e.g., hierarchies, validation links, and other suitable structures within the contemplated scope of the disclosure) whereby budgets created and maintained using CBMS 120 have standardized formatting and operational workflow.

MDMS 132 includes processor(s) 132(1) in communication with memory 132(2) that includes master data 121. MDMS 132 collects data from multiple sources organized for distribution, sharing, and often sub-setting and sharing. In some embodiments, MDMS is a hub and spoke architecture. MDMS is a centralized system to manage master data 121 of different users from different backgrounds. MDMS 132 allows multiple users to access master data 121 while controlling the privilege of the users based on the user's persona. MDMS 132 allows budget admin to create master data 121 in different manners (e.g., via manually inputting information to the UI, or via uploading a document). Such features allow budget admin with different backgrounds to build the master data in a preferred manner, while ensuring the standardization of master data 121. MDMS 132 allows CBMS 120 to compare the parameters inputted by users (when creating budget application) with an allowed budget application (which is defined by master data 121), to reduce the rate of incorrect budget application and reduce the human resources for reviewing incorrect budget application and shorten the overall turnaround time of the budget application.

CBDRS 100 system architecture includes CBMS 120 communicatively connected to MDMS 132. CBMS 120 is communicatively connected to a user interface 104 of a user (e.g., budget originator, budget reviewer, or other suitable budget personnel within the contemplated scope of the disclosure). MDMS 132 is communicatively connected to a UI, such as any of UIs 104 of a budget administrator, and master data 121 and/or budget database 123. In some embodiments, CBMS 120 and MDMS 132 are deployed on one or more cloud servers.

Figure 2:
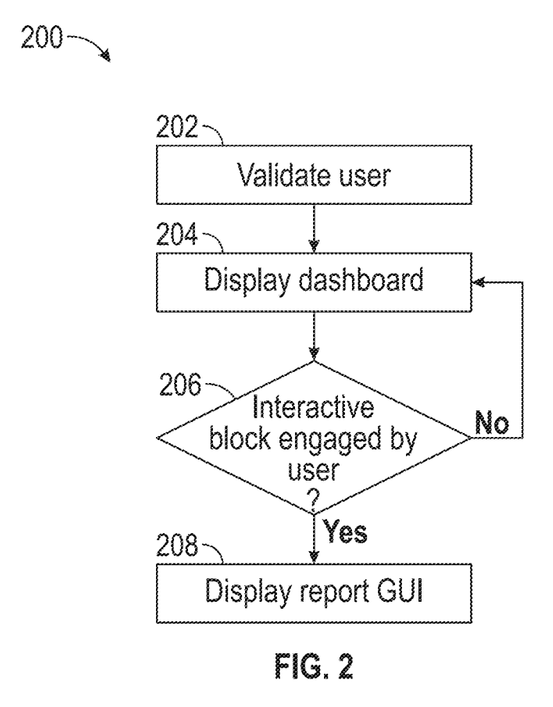
FIG. 2 is a flowchart of a method for configuring budget dashboard and report, in accordance with some embodiments.

FIG. 2 is a flowchart of a method for configuring budget dashboard and report 200, in accordance with some embodiments.

Method 200 is executed by processing circuitry 126 discussed above with respect to FIG. 1. In some embodiments, method 200 is a method of dynamically dashboard and report budget data to a UI or other suitable user experience/user terminals within the contemplated scope of the disclosure. In some embodiments, some, or all the operations of method 200 are executed in accordance with instructions corresponding to budget management software 122 discussed above with respect to FIG. 1.

Method 200 includes operations 202-208, but the operations are not necessarily performed in the order shown. Operations are added, replaced, order changed, and/or eliminated as appropriate, in accordance with the spirit and scope of disclosed embodiments. In some embodiments, one or more of the operations of method 200 are repeated. In some embodiments, unless specifically stated otherwise, the operations of method 200 are performed in order.

Method 200 is discussed with reference to FIG. 2 and to FIGS. 3-7 that display multiple GUIs in accordance with some embodiments. The discussion of these GUI embodiments are not exhaustive as other suitable GUIs are within the contemplated scope of the disclosure. Further, the appearance of each GUI is generic and one of ordinary skill in the art is able to contemplate other variations. Not all GUIs are necessary to the operation of CBDRS 100 unless specifically stated otherwise. Further, a portion of GUI embodiments are left out for the sake of brevity and conciseness. However, one of ordinary skill in the art is able to contemplate other GUIs that are configured to be added to a systematic and uniform CBDRS, such as CBDRS 100.

Figure 3:
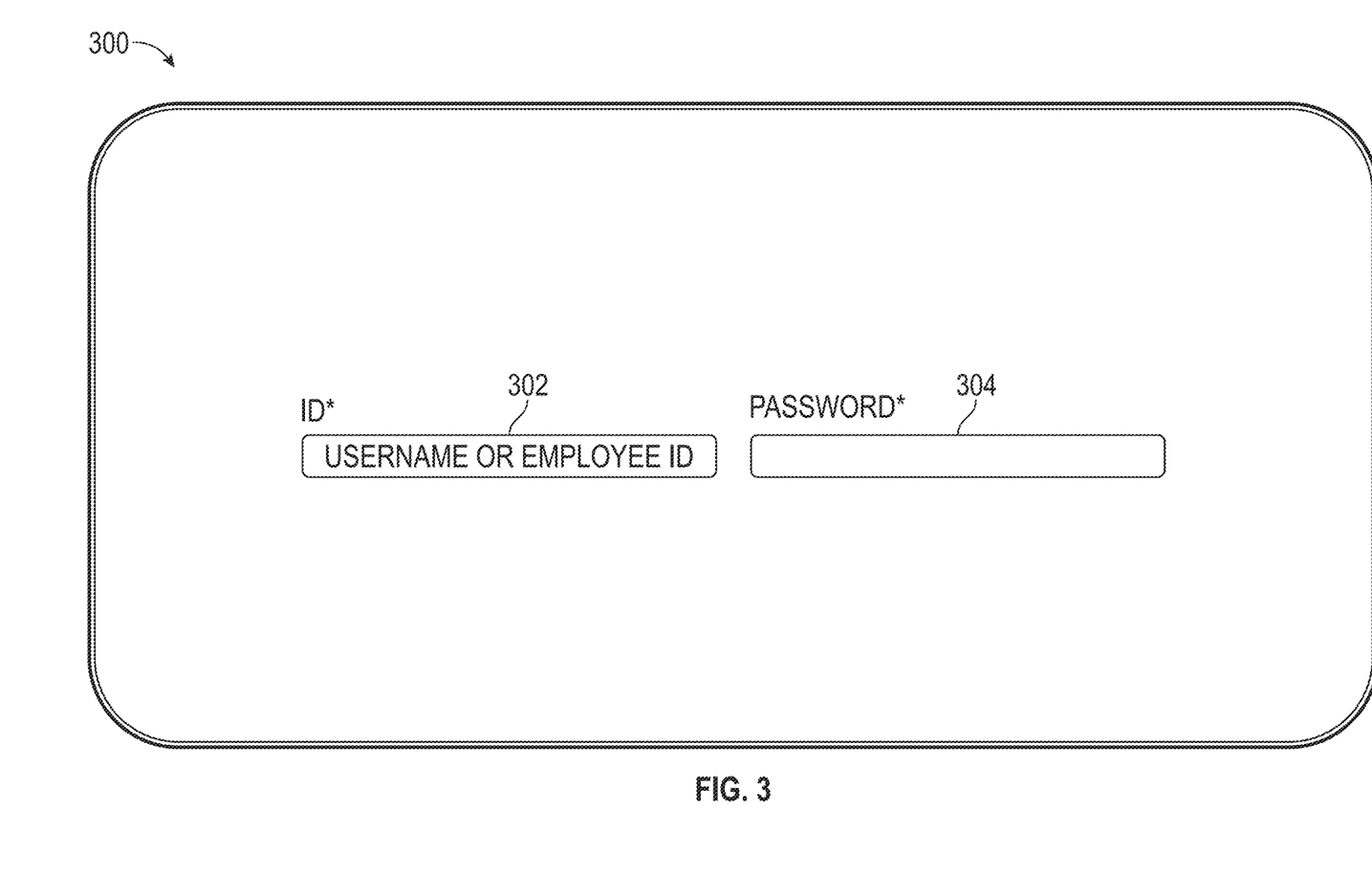
FIG. 3 depicts a graphical user interface (GUI) for a login page, in accordance with some embodiments.

FIG. 3 depicts a GUI 300 for a login page, in accordance with some embodiments.

In operation 202 of method 200, a user log into CBDRS 100. In a non-limiting example, at GUI 300 (depicted in FIG. 3) a user (e.g., a budget administrator) is presented with user input fields 302 and 304. The user inputs an ID (such as a username, employee ID, or other suitable identification within the contemplated scope of the disclosure) into user input field 302 and a password linked to the budget administrator in user input field 304. In response to CBDRS 100 determining that the input ID and password are accurate, the CBDRS 100 will grant access to the user.

In FIG. 1. CBDRS 100 is in electronic communication with master data storage 121 that includes master data associated with each user of CBDRS 100. Master data 121 includes information for each user. Master data 121 includes information of: the location where the user works, the budgets that the user is currently handling and/or has handled in the past, and other suitable information within the contemplated scope of the disclosure. In some embodiments, the master data 121 includes information associated with a user for which a budget application is submitted.

In response to a user logging into CBDRS 100 (e.g., by inputting identification (ID) at user input field 302 and a password at user input field 304), CBDRS 100 extracts the user's master data 121 from memory 132(2), processes master data 121, and allows the user access to a budget dashboard.

Based on the user's master data, the CBDRS 100 determines an access restriction associated with the user. For example, CBDRS 100 determines from the master data that the user is in region 1 and determines that the user is restricted to access the system to view the dashboard and reports associated with region 1. Based on the determined access restriction, CBDRS 100 retrieves the budget data associated with the user, and then generates a GUI to present the budget data in the form of dashboard and reports. Since CBDRS 100 retrieves and presents the latest budget data to the user, CBDRS 100 effectively provides an updated budget report to the user upon user log in to CBDRS 100. Further, since the dashboard/report shows budget data associated with the user, CBDRS 100 provides a customized budget report to the user. Additionally, or alternatively, the information security is enhanced since budget information unrelated to the user is unable to be shown. Process flows from operation 202 to operation 204.

Figure 4:
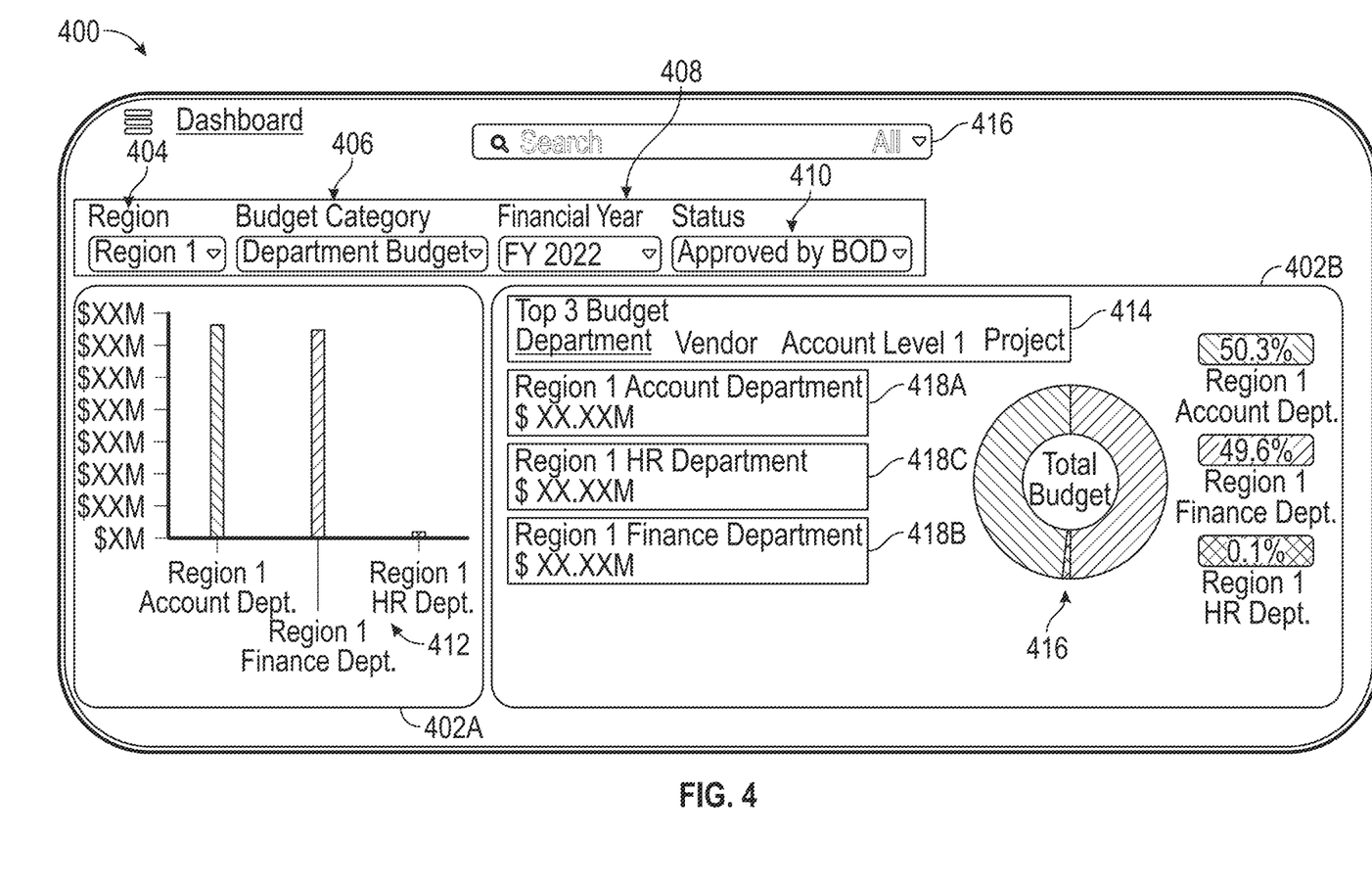
FIG. 4 depicts a budget dashboard GUI, in accordance with some embodiments.

FIG. 4 depicts a dashboard GUI 400, in accordance with some embodiments.

In operation 204 of method 200, CBDRS 100 displays dashboards 402A and 402B with dashboard GUI 400. Dashboard GUI 400 is generated by the CBDRS 100 and presented to the user in response to the user accessing a dashboard page. In some embodiments, dashboard GUI 400 is generated by the CBDRS 100 and presented to the user in response to a successful login of the user.

In a non-limiting example of FIG. 4, the presented information is pre-selected or pre-populated by CBDRS 100 based upon the user's master data. Continuing with the example, "Region 1" is displayed in user selection field 404 as the region, "Department Budget" is displayed in user selection field 406 as the budget type, financial year "FY 2022" is displayed in user selection field 408 as the financial year, and "Approved by board of directors (BOD)" is displayed in user selection field 410 as the status of the budget. In some embodiments, the information displayed in user selection fields 404, 406, 408 and 410 is pre-selected based on the user's information (e.g., regional information, department information, information of previously created budget application(s), or other suitable identification information within the scope of the present disclosure) defined by master data 121, or based on a configuration history established by the user (e.g., the information/parameters selected by the user in the previous log-in session). The parameters illustrated in FIG. 4 are examples and are not be limited to the illustrated parameters. For instance, the user further selects "Project Budget" in user selection field 406, so as to view the dashboard in project budget level. Further, the user further selects available financial year in user selection field 408, and selects suitable status of budget in user selection field 410.

Continuing with the non-limiting example, two dashboards 402A and 402B are displayed in dashboard GUI 400. In dashboard 402A, a graph 412 displays a budget overview of the selected budget in user selection field 406. In some embodiments, dashboard 402A displays information associated with the budget type of the selected budget. In dashboard 402B, the top 3 budget applications of various categories (e.g., Department, Vendor, Account Level 1, Project, or the like) within category bar 414 are displayed. The top 3 budgets in the departments associated with the user are presented (i.e., as department budget has been selected in user selection field 406), and a chart 416 displays a breakdown/percentage of the top 3 budgets as displayed.

In some embodiments, different users are presented with different top 3 budget selections within category bar 414. In some embodiments, the category bar 414 is an interactive region (e.g., a user input field, a drop-down list, or other suitable human interactive display in the scope of the present disclosure) which allows the user to configure the dashboard presentation in a different manner (e.g., top 10 budgets, top 3 budgets, highest/lowest budget, budgets over X values, budgets below Y values, or other suitable arrangement within the scope of the present disclosure).

In some embodiments, in response to CBDRS 100 determining (based on the user's master data) that the user's access level is restricted to one region, user selection field 404 is hidden from the dashboard and CBDRS 100 automatically limits the budget reports presentation to the restricted region.

In some embodiments, dashboard 402B includes interactive blocks 418A, 418B, and 418C, each of which is linked to a page of the budget report (e.g., via hyperlink). Each budget report has a dedicated identifier (e.g., ID, title, or other suitable identifier within the scope of the present disclosure). In response to a user accessing dashboard 402B, CBDRS 100 determines the parameters configured/specified by the user (e.g., region, budget category, or other parameter within the scope of the present disclosure) in each of the input fields, determines which budget report is associated with the configured/specified parameters, retrieves the data of the budget report from the data storage, generates (based on the retrieved data) interactive blocks, such as interactive blocks 418A, 418B, and 418C, for each budget report (in response to CBDRS 100 determining that the retrieved budget reports are greater than 3, CBDRS 100 determines the top 3 highest budgets and generates interactive blocks for only the determined top 3 budgets). During generation of the interactive blocks, the CBMS will determine the identifier of the budget report and link the interactive blocks to the dedicated budget report based on the identifier.

In some embodiments, the user opts to view a summary of the top 3 budget reports on dashboard 402B or choose to view the detailed budget report by interacting (e.g., double clicking) one or more of interactive blocks 418A, 418B, or 418C. Process flows from operation 204 to operation 206. In some embodiments, dashboard GUI 400 includes a search bar 416 to allow the user to quickly search for a dashboard by inputting a keyword into the search bar.

Figure 5:
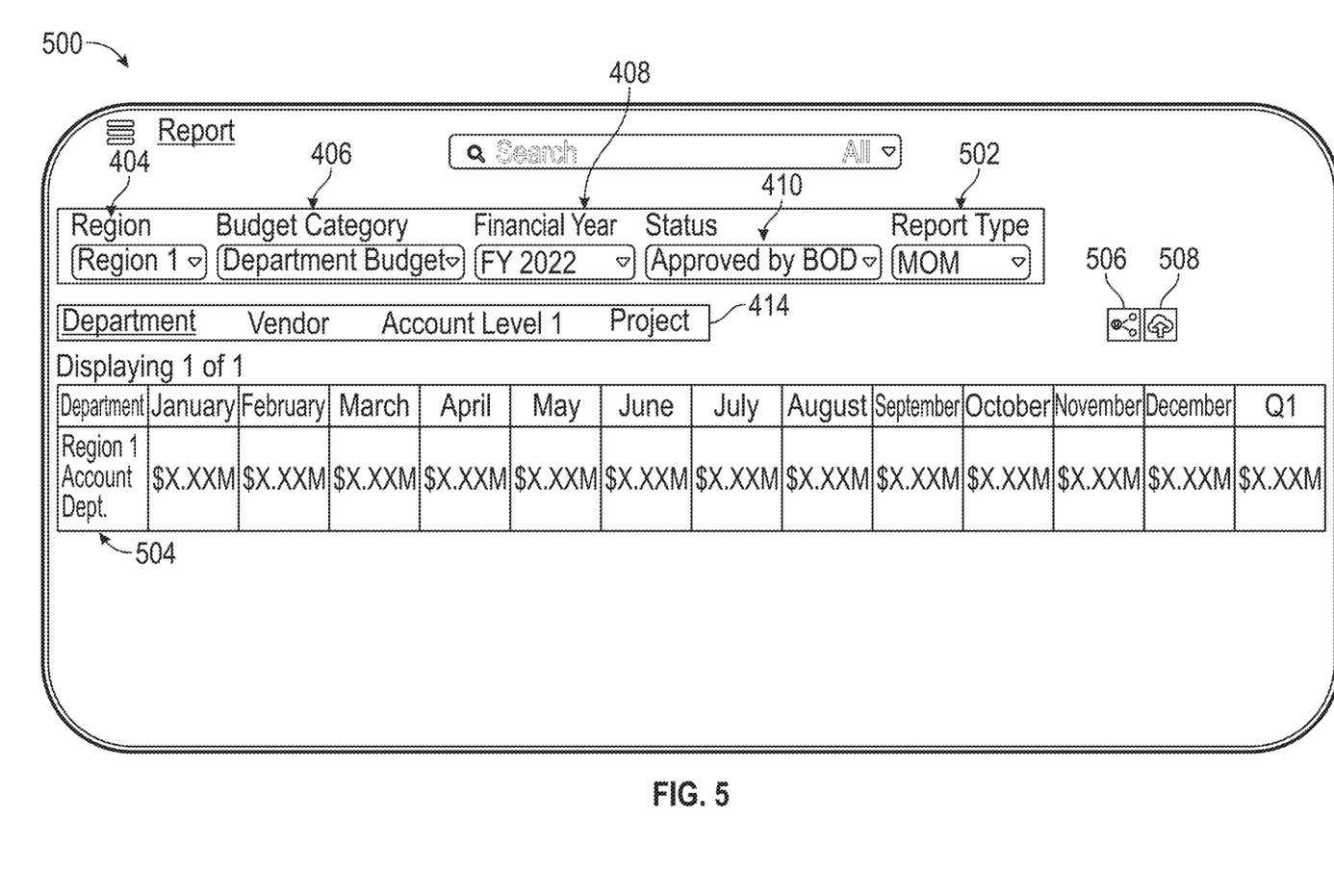
FIG. 5 depicts a budget report GUI, in accordance with some embodiments.

FIG. 5 depicts a budget report GUI 500, in accordance with some embodiments.

In operation 206, CBDRS 100 determines whether the user has engaged with interactive blocks, such as interactive blocks 418A, 418B, or 418C. In response to the user engaging an interactive block ("YES" branch of block 206), the user progresses to operation 208 where a report GUI is displayed along with the budget or budgets associate with the selected interactive blocks. In response to the user not engaging an interactive block ("NO" branch of block 206), CBDRS 100 continues to display dashboard GUI 400.

In response to receiving an interaction from the user, CBDRS 100 determines (based on the identifier) a budget report associated to the selected interactive block and redirects the user to report GUI 500 (FIG. 5). As are discussed in more details below, report GUI 500 presents budget reports associated with the user (e.g., when the user opts to access report page 500 directly (FIG. 6), instead of accessing report page 500 indirectly via dashboard page 402B). In this non-limiting example, since the user opts to access report page 500 via dashboard 402B (e.g., by interacting with interactive block 418A, 418B, or 418C), CBDRS 100 determines the identifier of the budget report associated with the selected interactive block, and presents the budget report selected by the user based on the identifier (e.g., filters out budget reports which do not have an identifier matching with the identifier of the selected interactive block).

In some embodiments, the user simultaneously selects multiple interactive blocks from dashboard 402B (e.g., hold CTRL button and click on each interactive block), and CBDRS 100 collects the identifiers associated with the budget applications of the selected interactive blocks, generates, and presents the details of multiple budget applications to the user in the report page.

In some embodiments, GUI 500 displays details of budget reports after the user interacted with an interactive block, such as interactive block 418A, 418B, or 418C, of dashboard 402B. FIG. 5 illustrates an example of GUI 500 after the user interacted with interactive block 418A.

In a non-limiting example, since selected budget 504 is an applied annual budget report (e.g., for financial year 2022) and Month Over Month (MOM) is selected as the report type in user selection field 502, the details of budget report 504 include breakdowns of the annual budget application in monthly basis (e.g., January through December). As discussed above, monthly budgets are specified by the user during creation of the budget application. In some embodiments, other details (e.g., budget creator, status, or other budget identifiers/information within the scope of the present disclosure) are included. In some embodiments, the details vary according to the parameters selected by the user (e.g., in response to the user selecting quarter on quarter (QoQ) in user selection field 502, the budget reports of each quarter of the selected financial year are presented, instead of monthly basis as illustrated in FIG. 5; selections and illustration of other report types, such as year to date (YTD), year over year (YoY), and the like, are contemplated).

In some embodiments, interactive blocks 418A, 418B, or 418C of dashboard 402B allow a user to quickly understand an overview of the budget report, to select a specific budget report, and to access the details of the budget report. Thus, the user is guided and navigated to the budget report and the associated information without having a deep background knowledge or spending a lot of time searching for relevant information. In some embodiments, the user quickly downloads or exports the report by interacting with an interactive block of dashboard 402B (e.g., right-clicking on interactive block 418A, 418B, or 418C, or the like).

Report GUI 500 includes user selection fields 404, 406, 408, 410, and 502 that allow a user to configure/select parameters for customizing the presentation of the budget reports. In a non-limiting example, the user selection fields 404, 406, 408, 410, and 502 include a drop-down list of region (404), budget category (406), report type 502 (e.g., MoM, YTD, YoY, QOQ, or other suitable periodic measurements within the scope of the present disclosure), financial year (408), and status (410). In some embodiments, other suitable information/parameters are included for the user's selection. A drop-down list (abbreviated drop-down, or DDL; also known as a drop-down menu, drop menu, pull-down list, and picklist) is a graphical control element, similar to a list box, that allows the user to choose one value from a list. When a drop-down list is inactive, it displays a single value. When activated, it displays (drops down) a list of values, from which the user selects one. When the user selects a new value, the control reverts to its inactive state, displaying the selected value.

In some embodiments, report GUI 500 includes a list of report budgets associated with the user (e.g., determined by CBDRS 100 as associated to the user based on the user's master data), in which the list of budget reports is categorized into several main levels as shown in category bar 414 (e.g., Department, Vendor, Account Level 1, Project, or other suitable level within the scope of the present disclosure). By doing so, the user easily navigates to the budget reports of various levels.

In some embodiments, a user shares a report using share icon 506. In some embodiments, a user shares a report with another user as long as the other user is able to view the report based on master data 121. In some embodiments, a user exports a report using export icon 508. For example, the user exports the report to a spreadsheet, downloads a copy, or imports a copy to a presentation template.

Figure 6:
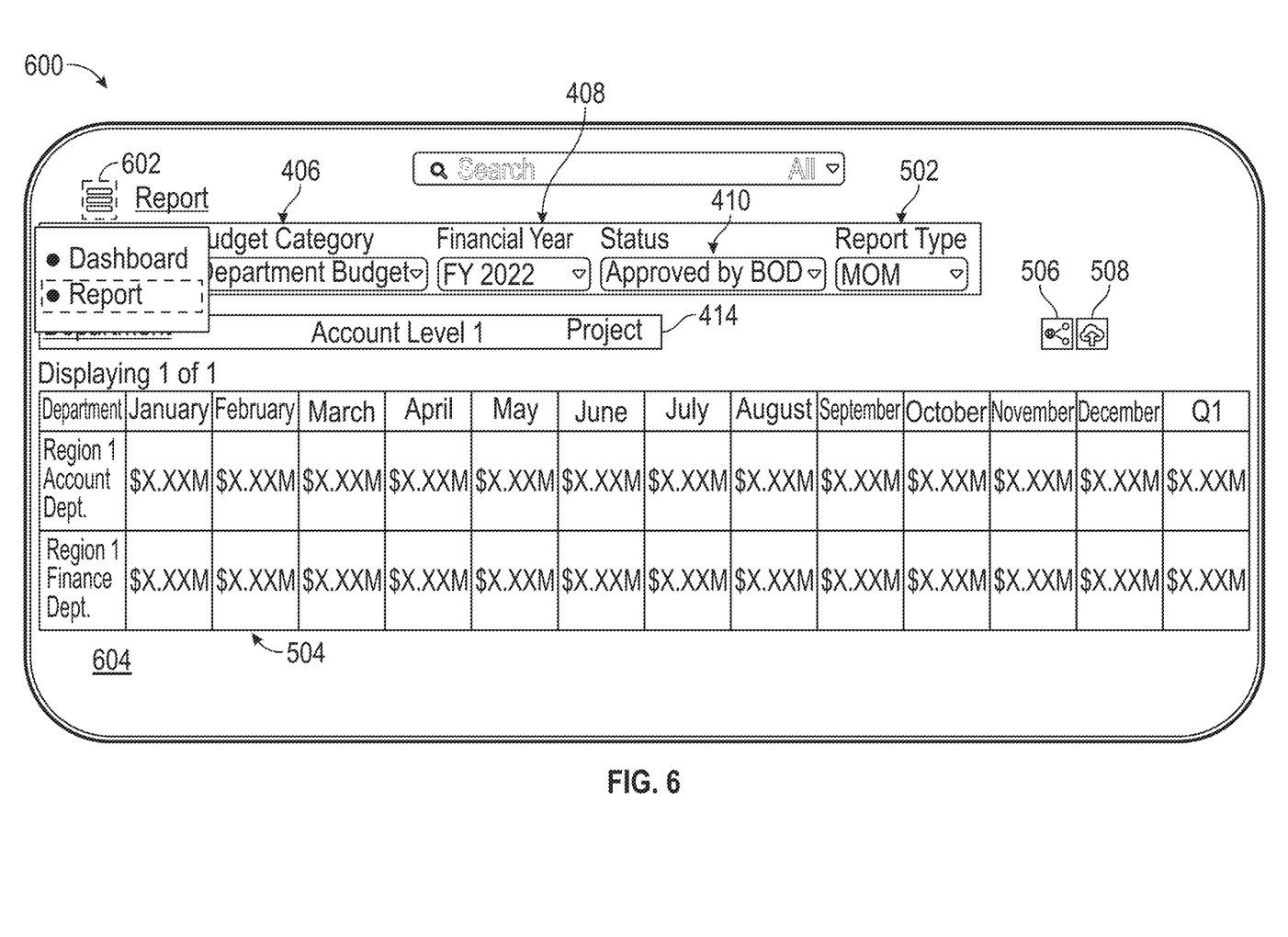
FIG. 6 depicts a budget dashboard GUI, in accordance with some embodiments.

FIG. 6 depicts a budget report GUI 600, in accordance with some embodiments.

In some embodiments, report GUI 600 is like report GUI 500. In some embodiments, the user directly accesses report GUI 600 (instead of indirectly accessing report GUI 500 via dashboard 402B) through menu board 604. In some embodiments, a user clicks on menu button 602 to display menu board 604. In some embodiments, from menu board 604, the user selects the dashboard page to display dashboards (e.g., dashboards 402A, 402B, or the like), and selects report page to display reports (e.g., report GUI 600). In some embodiments, menu board 604 includes other suitable options selectable by the user, such as a budget management page, a forecast management page, general settings page, connected applications page, and the like.

In some embodiments, a user exports at least one budget report of the list of budget reports. In some embodiments, the user exports the budget report in multiple formats, according to their requirement. In some embodiments, the CBDRS 100 compiles/creates a budget report in response to the user's request. In some embodiments, since the budget report is created based on the user's selected parameters and format, the budget report is customized for the user. Accordingly, the user obtains a customized report from the CBDRS 100, without requiring the cost office/financial department to be involved in the generation of budget report. As budget reports associated with user are presented and selectable by the user, the exported/generated budget report contains information that is authorized to the user. Thus, information security is enhanced.

Figure 7:
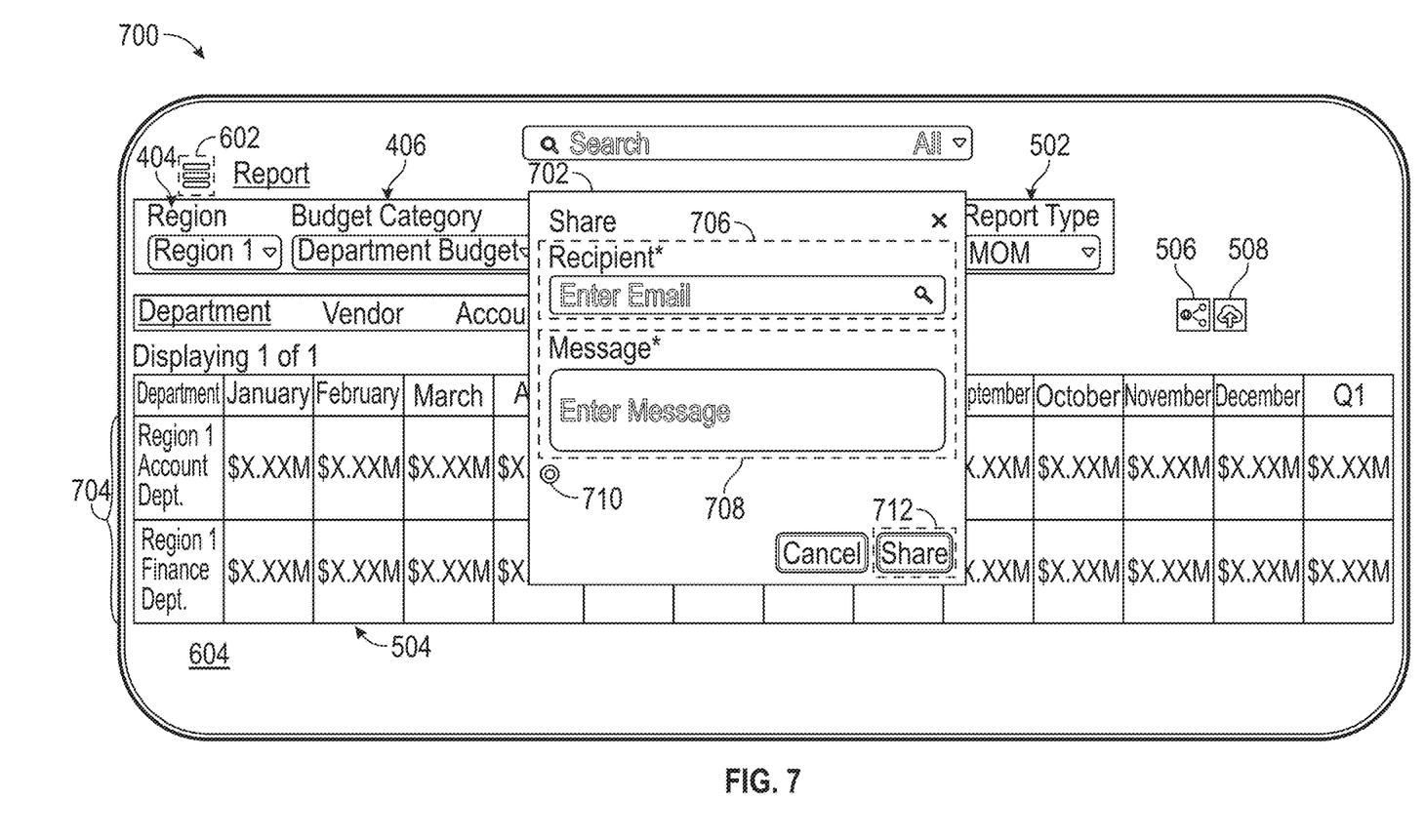
FIG. 7 depicts a budget dashboard GUI, in accordance with some embodiments.

FIG. 7 depicts a budget report GUI 700, in accordance with some embodiments.

In some embodiments, in response to the user clicking on share icon 506, share pop-up box 702 is displayed in GUI 700 and a user shares at least one budget report of the list of budget reports 704 to other user(s) or a workgroup(s). In some embodiments, the user shares the at least one budget report to user(s) authorized by the CBDRS 100 (e.g., in response to the user inserting an email into email user input filed 706 of unauthorized users, the CBDRS rejects the share request or requires the user to obtain approval from a PIC such as his manager, PIC of cost office/financial department, or the like). In some embodiments, the user includes a message (e.g., a message up to 150 characters) in message user input field 708, and/or adds attachment with attachment user selection field 710 (e.g., attachment of a generated budget report, or the like) when sharing the budget report to another user by clicking on share user selection field 712.

In some embodiments, a centralized budget dashboard and report system (CBDRS) includes a memory having non-transitory instructions stored therein; and processing circuitry coupled to the memory, and being configured to execute the non-transitory instructions, thereby causing the processing circuitry to cause a graphical user interface (GUI) to be output by a user interface (UI), the GUI including a first user input field configured to receive a first user input identifying an authorized user to log in to the CBDRS; in response to a successful log in to the CBDRS, obtain master data from the memory, the master data being associated with the authorized user; and update the GUI output by the UI, the updated GUI including a budget dashboard configured to display budget data associated with the authorized user.

In some embodiments, the CBDRS further includes a budget database coupled to the processing circuitry; the processing circuitry coupled to the budget database, and being configured to execute the non-transitory instructions, thereby causing the processing circuitry to receive granular real-time budget data from the budget database; cause the GUI to be output by the UI, the GUI including the budget dashboard configured to display the granular real-time budget data associated with the authorized user, wherein the granular real-time budget data is configured to be modified by the authorized user.

In some embodiments, a lowest stored granular budget data is monthly budget data.

In some embodiments, the budget dashboard is further configured to display: a first user selection field configured to receive a user region selection; a second user selection field configured to receive a user budget category selection; a third user selection field configured to receive a user financial year selection; and a fourth user selection field configured to receive a user status selection.

In some embodiments, the first, the second, the third, and the fourth user selection fields are, upon initial display of the budget dashboard, displayed with preset configurations stored within the master data.

In some embodiments, the budget dashboard is further configured to display: a chart illustration of the budget data associated with the authorized user; and a summary of budget applications associated with the authorized user.

In some embodiments, the budget dashboard is further configured to display: a first user selection field configured to receive a user top department budgets selection; a second user selection field configured to receive a user top vendor budgets selection; a third user selection field configured to receive a user top account level budgets selection; and a fourth user selection field configured to receive a user top project budgets selection.

In some embodiments, in response to receiving a user selection for the user top department budgets selection, the budget dashboard is further configured to display: one or more top department budgets associated with the authorized user; in response to receiving a user selection for the user top vendor budgets selection, the budget dashboard is further configured to display: one or more top vendor budgets associated with the authorized user; in response to receiving a user selection for the user top account level budgets selection, the budget dashboard is further configured to display: one or more top account level budgets associated with the authorized user; and in response to receiving a user selection for the user top project budgets selection, the budget dashboard is further configured to display: one or more top project budgets associated with the authorized user.

In some embodiments, the budget dashboard is further configured to display: a menu user selection field configured to display a menu including a report option for selection; in response to receiving an input from the report option, update the GUI output by the UI, the updated GUI including a budget report configured to display budget reports associated with the authorized user.

In some embodiments, a method executed by processing circuitry including causing a graphical user interface (GUI) to be output by a user interface (UI), the GUI including a first user input field configured to receive a first user input identifying an authorized user to log in to a centralized budget dashboard and report system (CBDRS); in response to a successful log in to the CBDRS, obtaining master data from a database, the master data being associated with the authorized user; and updating the GUI output by the UI, the updated GUI including a budget dashboard configured to display budget data associated with the authorized user.

In some embodiments, the processing circuitry is coupled to a budget database, and being configured to execute non-transitory instructions, the method further including receiving granular real-time budget data from the budget database; causing the GUI to be output by the UI, the GUI including the budget dashboard configured to display the granular real-time budget data associated with the authorized user, wherein the granular real-time budget data is configured to be modified by the authorized user.

In some embodiments, a lowest stored granular budget data is monthly budget data.

In some embodiments, the budget dashboard is further configured to display a first user selection field configured to receive a user region selection; a second user selection field configured to receive a user budget category selection; a third user selection field configured to receive a user financial year selection; and a fourth user selection field configured to receive a user status selection.

In some embodiments, the first, the second, the third, and the fourth user selection fields are, upon initial display of the budget dashboard, displayed with preset configurations stored within the master data.

In some embodiments, a non-transitory computer readable medium including instructions executable by a controller to perform operations including causing a graphical user interface (GUI) to be output by a user interface (UI), the GUI including a first user input field configured to receive a first user input identifying an authorized user to log in to a centralized budget dashboard and report system (CBDRS); in response to a successful log in to the CBDRS, obtaining master data from a database, the master data being associated with the authorized user; and updating the GUI output by the UI, the updated GUI including a budget dashboard configured to display budget data associated with the authorized user.

In some embodiments, the budget dashboard is further configured to display a first user selection field configured to receive a user region selection; a second user selection field configured to receive a user budget category selection; a third user selection field configured to receive a user financial year selection; and a fourth user selection field configured to receive a user status selection.

In some embodiments, the budget dashboard is further configured to display a chart illustration of the budget data associated with the authorized user; and a summary of budget applications associated with the authorized user.

In some embodiments, the budget dashboard is further configured to display a first user selection field configured to receive a user top department budgets selection; a second user selection field configured to receive a user top vendor budgets selection; a third user selection field configured to receive a user top account level budgets selection; and a fourth user selection field configured to receive a user top project budgets selection.

In some embodiments, in response to receiving a user selection for the user top department budgets selection, the budget dashboard is further configured to display: one or more top department budgets associated with the authorized user; in response to receiving a user selection for the user top vendor budgets selection, the budget dashboard is further configured to display: one or more top vendor budgets associated with the authorized user; in response to receiving a user selection for the user top account level budgets selection, the budget dashboard is further configured to display: one or more top account level budgets associated with the authorized user; and in response to receiving a user selection for the user top project budgets selection, the budget dashboard is further configured to display: one or more top project budgets associated with the authorized user.

In some embodiments, the budget dashboard is further configured to display: a menu user selection field configured to display a menu including a report option for selection; in response to receiving an input from the report option, update the GUI output by the UI, the updated GUI comprising: a budget report configured to display budget reports associated with the authorized user.

The foregoing outlines features of several embodiments so that those skilled in the art are able to better understand the aspects of the present disclosure. Appreciation by those skilled in the art that the present disclosure is a basis for designing or modifying other processes and structures for carrying out the same purposes and/or achieving the same advantages of the embodiments introduced herein is contemplated. Those skilled in the art further realize that such equivalent constructions do not depart from the spirit and scope of the present disclosure, and to make various changes, substitutions, and alterations herein without departing from the spirit and scope of the present disclosure is contemplated.

What is claimed is:

1. A centralized budget dashboard and report system (CBDRS), comprising:
    a memory having non-transitory instructions stored therein; and
    processing circuitry coupled to the memory, and being configured to execute the non-transitory instructions, thereby causing the processing circuitry to:
        cause a graphical user interface (GUI) to be output by a user interface (UI), the GUI comprising:
            a first user input field configured to receive a first user input identifying an authorized user to log in to the CBDRS;
        in response to a successful log in to the CBDRS, obtain master data from the memory, the master data being associated with the authorized user;
        restrict access of the authorized user based on a location of the user determined based on the obtained master data;
        update the GUI output by the UI, the updated GUI comprising:
            a budget dashboard configured to display budget data associated with the authorized user;
        receive a share request from the authorized user for sharing, with at least one sharing user, the budget dashboard associated with the authorized user; and
        in response to a determination that any of the at least one sharing user is unauthorized automatically rejecting the share request from the authorized user.

2. The CBDRS of claim 1, further comprising:
    a budget database coupled to the processing circuitry;
    the processing circuitry being configured to:
        receive granular real-time budget data from the budget database;
        cause the GUI to be output by the UI, the GUI comprising:
            the budget dashboard configured to display the granular real-time budget data associated with the authorized user, wherein the granular real-time budget data is configured to be modified by the authorized user.

3. The CBDRS of claim 1, wherein:
the processing circuitry is configured to restrict access of the user based on the location of the user by updating the GUI with only information related to a region where the user is located.

4. The CBDRS of claim 1, wherein:
the budget dashboard is further configured to display:
a first user selection field configured to receive a user region selection;
a second user selection field configured to receive a user budget category selection;
a third user selection field configured to receive a user financial year selection; and
a fourth user selection field configured to receive a user status selection.

5. The CBDRS of claim 4, wherein:
the first, the second, the third, and the fourth user selection fields are, upon initial display of the budget dashboard, displayed with preset configurations stored within the master data.

6. The CBDRS of claim 1, wherein:
the budget dashboard is further configured to display:
a chart illustration of the budget data associated with the authorized user; and
a summary of budget applications associated with the authorized user.

7. The CBDRS of claim 1, wherein:
the budget dashboard is further configured to display:
a first user selection field configured to receive a user top department budgets selection;
a second user selection field configured to receive a user top vendor budgets selection;
a third user selection field configured to receive a user top account level budgets selection; and
a fourth user selection field configured to receive a user top project budgets selection.

8. The CBDRS of claim 7, wherein:
in response to receiving a user selection for the user top department budgets selection, the budget dashboard is further configured to display:
one or more top department budgets associated with the authorized user;
in response to receiving a user selection for the user top vendor budgets selection, the budget dashboard is further configured to display:
one or more top vendor budgets associated with the authorized user;
in response to receiving a user selection for the user top account level budgets selection, the budget dashboard is further configured to display:
one or more top account level budgets associated with the authorized user; and
in response to receiving a user selection for the user top project budgets selection, the budget dashboard is further configured to display:
one or more top project budgets associated with the authorized user.

9. The CBDRS of claim 1, wherein:
the budget dashboard is further configured to display:
a menu user selection field configured to display a menu including a report option for selection;
in response to receiving an input from the report option, update the GUI output by the UI, the updated GUI comprising:
a budget report configured to display budget reports associated with the authorized user.

10. A method executed by processing circuitry, the method comprising:
causing a graphical user interface (GUI) to be output by a user interface (UI), the GUI comprising:
a first user input field configured to receive a first user input identifying an authorized user to log in to a centralized budget dashboard and report system (CBDRS);
in response to a successful log in to the CBDRS, obtaining master data from a database, the master data being associated with the authorized user;
restricting access of the authorized user based on a location of the user determined based on the obtained master data;
updating the GUI output by the UI, the updated GUI comprising:
a budget dashboard configured to display budget data associated with the authorized user;
receiving a share request from the authorized user for sharing, with at least one sharing user, the budget dashboard associated with the authorized user; and
in response to a determination that any of the at least one sharing user is unauthorized automatically rejecting the share request from the authorized user.

11. The method of claim 10, wherein the processing circuitry is coupled to a budget database, and being configured to execute non-transitory instructions, the method further comprising:
receiving granular real-time budget data from the budget database;
causing the GUI to be output by the UI, the GUI comprising:
the budget dashboard configured to display the granular real-time budget data associated with the authorized user, wherein the granular real-time budget data is configured to be modified by the authorized user.

12. The method of claim 10, wherein:
updating the GUI to include only information based on a region where the user is located.

13. The method of claim 10, wherein the budget dashboard is further configured to display:
a first user selection field configured to receive a user region selection;
a second user selection field configured to receive a user budget category selection;
a third user selection field configured to receive a user financial year selection; and
a fourth user selection field configured to receive a user status selection.

14. The method of claim 13, wherein:
the first, the second, the third, and the fourth user selection fields are, upon initial display of the budget dashboard, displayed with preset configurations stored within the master data.

15. A non-transitory computer readable medium including instructions executable by a controller to perform operations comprising:
causing a graphical user interface (GUI) to be output by a user interface (UI), the GUI comprising:
a first user input field configured to receive a first user input identifying an authorized user to log in to a centralized budget dashboard and report system (CBDRS);

in response to a successful log in to the CBDRS, obtaining master data from a database, the master data being associated with the authorized user;

restricting access of the authorized user based on a location of the user determined based on the obtained master data;

updating the GUI output by the UI, the updated GUI comprising:
    a budget dashboard configured to display budget data associated with the authorized user;

receiving a share request from the authorized user for sharing, with at least one sharing user, the budget dashboard associated with the authorized user; and in response to a determination that any of the at least one sharing user is unauthorized automatically rejecting the share request from the authorized user.

16. The non-transitory computer readable medium of claim 15, wherein:
the budget dashboard is further configured to display:
    a first user selection field configured to receive a user region selection;
    a second user selection field configured to receive a user budget category selection;
    a third user selection field configured to receive a user financial year selection; and
    a fourth user selection field configured to receive a user status selection.

17. The non-transitory computer readable medium of claim 15, wherein:
the budget dashboard is further configured to display:
    a chart illustration of the budget data associated with the authorized user; and
    a summary of budget applications associated with the authorized user.

18. The non-transitory computer readable medium of claim 15, wherein:
the budget dashboard is further configured to display:
    a first user selection field configured to receive a user top department budgets selection;
    a second user selection field configured to receive a user top vendor budgets selection;
    a third user selection field configured to receive a user top account level budgets selection; and
    a fourth user selection field configured to receive a user top project budgets selection.

19. The non-transitory computer readable medium of claim 18, wherein:
in response to receiving a user selection for the user top department budgets selection, the budget dashboard is further configured to display:
    one or more top department budgets associated with the authorized user;

in response to receiving a user selection for the user top vendor budgets selection, the budget dashboard is further configured to display:
    one or more top vendor budgets associated with the authorized user;

in response to receiving a user selection for the user top account level budgets selection, the budget dashboard is further configured to display:
    one or more top account level budgets associated with the authorized user; and in response to receiving a user selection for the user top project budgets selection, the budget dashboard is further configured to display:
    one or more top project budgets associated with the authorized user.

20. The non-transitory computer readable medium of claim 15, wherein:
the budget dashboard is further configured to display:
    a menu user selection field configured to display a menu including a report option for selection;

in response to receiving an input from the report option, update the GUI output by the UI, the updated GUI comprising:
    a budget report configured to display budget reports associated with the authorized user.

* * * * *